United States Patent
Hamida et al.

(10) Patent No.: US 12,400,297 B2
(45) Date of Patent: *Aug. 26, 2025

(54) SYSTEM AND METHOD FOR SELF-CALIBRATED CONVOLUTION FOR REAL-TIME IMAGE SUPER-RESOLUTION

(71) Applicant: KING FAHD UNIVERSITY OF PETROLEUM AND MINERALS, Dhahran (SA)

(72) Inventors: Adnan Hamida, Dhahran (SA); Motaz Alfarraj, Dhahran (SA); Salam A. Zummo, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 390 days.

This patent is subject to a terminal disclaimer.

(21) Appl. No.: 17/982,208

(22) Filed: Nov. 7, 2022

(65) Prior Publication Data

US 2024/0161235 A1    May 16, 2024

(51) Int. Cl.
*G06T 3/4053* (2024.01)

(52) U.S. Cl.
CPC ................. *G06T 3/4053* (2013.01)

(58) Field of Classification Search
CPC .. G06T 3/4053; G06T 2200/28; G06T 3/4046
See application file for complete search history.

(56) References Cited

U.S. PATENT DOCUMENTS

| | | | |
|---|---|---|---|
| 10,701,394 B1* | 6/2020 | Caballero | G06N 3/045 |
| 11,967,043 B2* | 4/2024 | Potapov | G06T 3/4053 |
| 2023/0276023 A1* | 8/2023 | Kim | G06T 3/4046 |
| | | | 382/155 |

FOREIGN PATENT DOCUMENTS

| | | |
|---|---|---|
| CN | 113159057 A | 7/2021 |
| CN | 113254051 A | 8/2021 |
| CN | 113313644 A | 8/2021 |

(Continued)

OTHER PUBLICATIONS

Zou et al, Self-Calibrated Efficient Transformer for Lightweight Super-Resolution, arXiv:2204.08913v1 Apr. 19 (Year: 2022).*

(Continued)

*Primary Examiner* — Xiao Liu
(74) *Attorney, Agent, or Firm* — Oblon, McClelland, Maier & Neustadt, L.L.P.

(57) ABSTRACT

A system and a method for displaying super-resolution images generated from images of lower resolution, includes processor circuitry for a combination multi-core CPU and machine learning engine configured with an input for receiving the low resolution images, a feature extraction section to extract features from the low resolution images, non-linear feature mapping section, connected to the feature extraction section, generating feature maps using a self-calibrated block with pixel attention having a plurality of Depthwise Separable Convolution (DSC) layers, a late upsampling section combines at least one DSC layer and a skip connection that upsamples the feature maps to a predetermined dimension, and a video output for displaying approximate upsampled super-resolution images that corresponds to the low resolution images.

18 Claims, 9 Drawing Sheets

(56) References Cited

FOREIGN PATENT DOCUMENTS

CN    113936204 A    1/2022
WO    WO-2019153671 A1 *  8/2019  ........... G06T 3/4046

OTHER PUBLICATIONS

Hung et al, Real-time image super-resolution using recursive depthwise separable convolution network, IEEE Access, vol. 7, pp. 99804-99816 (Year: 2019).*
Tan, et al. ; Efficient Image Super-Resolution via Self-Calibrated Feature Fuse ; MDPI Sensors ; 01/02/202 ; 17 Pages.

* cited by examiner

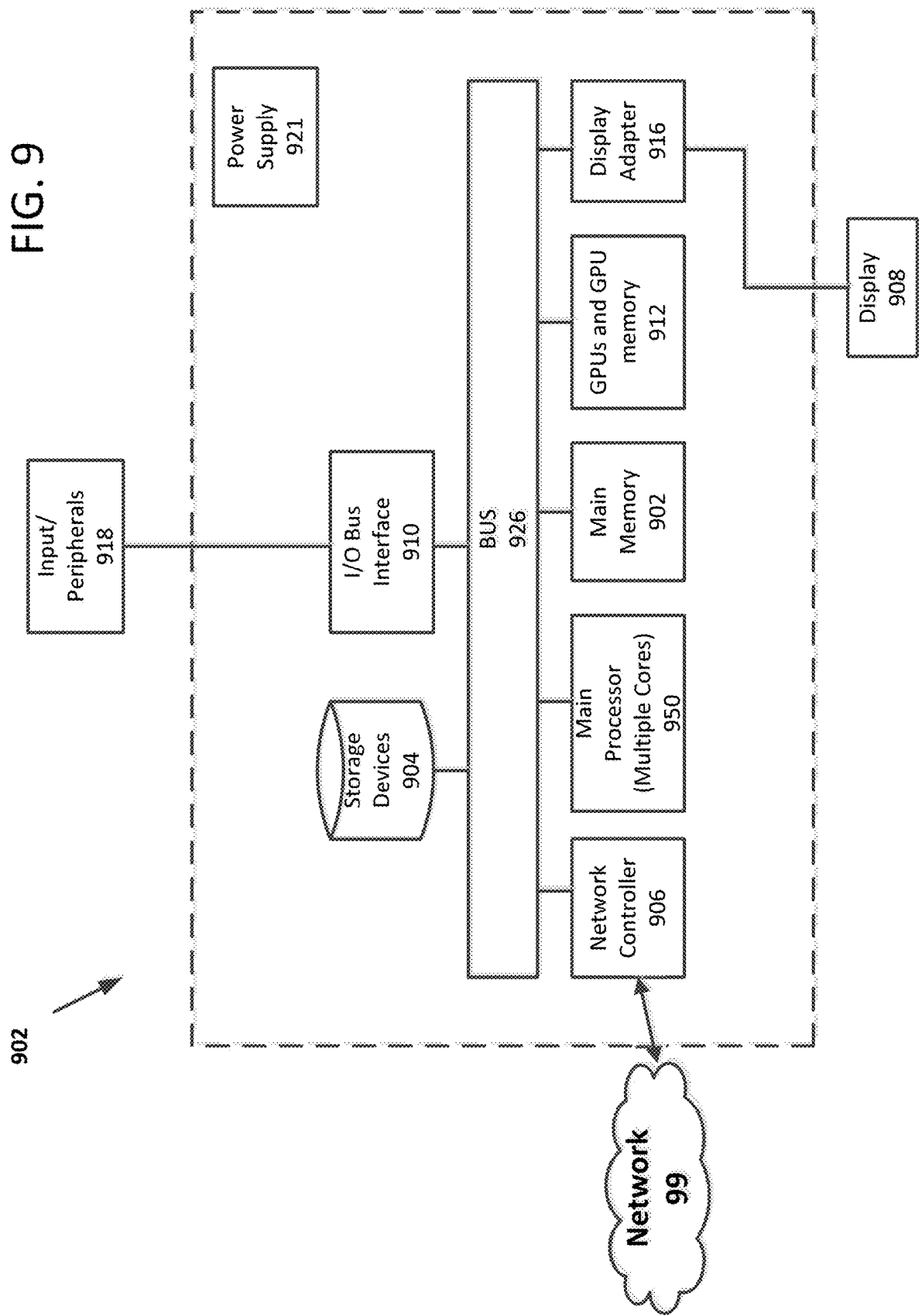

SYSTEM AND METHOD FOR SELF-CALIBRATED CONVOLUTION FOR REAL-TIME IMAGE SUPER-RESOLUTION

CROSS-REFERENCE TO RELATED APPLICATIONS

This application is related to non-provisional application Docket No. 542729US filed concurrently herewith, the entire contents of which are incorporated herein by reference.

BACKGROUND

Technical Field

The present disclosure is directed to a real-time image super-resolution of a low resolution image based on a self-calibrated block with pixel attention (ESC-PA) model using a convolutional neural network (CNN).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Single-image super-resolution (SISR) techniques are used in image processing to enhance a resolution of an image, in that a high-resolution (HR) image is reconstructed from a low-resolution (LR) image. The quality of the reconstructed HR image depends on available image-information present within the LR image. Presently, conventional systems perform super-resolution (SR) by employing operations such as interpolations, contour features, and statistical image priors. However, these systems face mainly two issues, that is, unclear definition of mapping for developing between the LR image and the HR image, and inefficiency in establishing a complex high-dimensional map from a raw data of large size.

Recently, convolutional neural networks (CNNs) have provided a significant improvement in SR accuracy, referred to as "SRCNNs" (i.e., super-resolution convolutional neural networks). However, SRCNN's accuracy is limited by a small structure, e.g., 3-layers, and/or a small context reception field. To overcome this limitation, the size of SRCNNs is increased, resulting in a use of a large number of parameters and non-execution of the SRCNNs in real-time. However, due to the large size of the SRCNNs, it becomes very difficult to determine appropriate training settings, i.e., learning rate, weight initialization, and weight decay.

There are wide variety of complex and sophisticated models that improve the quality of the reconstructed image by increasing depth and complexity of the models. However, having a number of parameters in order of millions sacrifices practicality of model deployment for applications that require real-time processing, such as online conferencing and mobile phones. Recently, a light SR model was introduced, that uses a recursive depth wise separable convolution (DSC). However, in the light SR model, required number of multiply-accumulate operations (MACs) increased due to the recursive operation. Earlier CNN architectures used SISR upsampled at the very beginning, and the CNN learned to refine and induce high-frequency information to obtain the SR image. However, providing a high-dimensional input image to the CNN is computationally expensive since most operations are performed on high-dimensional feature maps. Alternative to standard convolutional layers, DSC layers have been used in many SR models to improve efficiency while maintaining a same number of parameters. Later, an SSNet-M model was also proposed, with fewer layers and without the recursive block to reduce parameters and used MACs for real-time SR. However, SSNet-M used the super sampling technique which does not scale well when the desired upscale factor increases.

Accordingly, it is one object of the present disclosure to provide a system for real-time image super-resolution that reduces the number of parameters by using DSC layers throughout the operation and reduces MACs by adopting a late upsampling scheme.

SUMMARY

An aspect of the present disclosure is a video system for displaying super-resolution images generated from images of lower resolution, including processor circuitry for a combination multi-core CPU and machine learning engine configured with an input for receiving the low resolution images; a feature extraction section to extract features from the low resolution images; a non-linear feature mapping section, connected to the feature extraction section, generating feature maps using a self-calibrated block with pixel attention having a plurality of Depthwise Separable Convolution (DSC) layers; a late upsampling section combines at least one DSC layer and a skip connection that upsamples the feature maps to a predetermined dimension; and a video output for displaying approximate upsampled super-resolution images that corresponds to the low resolution images.

A further aspect is a method of displaying super-resolution images generated from images of lower resolution by processor circuitry for a combination multi-core CPU and machine learning engine, the processor circuitry comprising an input, a feature extraction section, a non-linear feature mapping section, a late upsampling section, and a video output. The method including receiving, via the input, the low resolution images; extracting, via the feature extraction section, features from the low resolution images; generating feature maps, via the non-linear feature mapping section connected to the feature extraction section, using a self-calibrated block with pixel attention having a plurality of Depthwise Separable Convolution (DSC) layers; upsampling the feature maps to a predetermined dimension to obtain an output, via the late upsampling section that is a combination of at least one DSC layer and a skip connection; and outputting, via the video output, approximate upsampled super-resolution images as the output that corresponds to the low resolution images.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 9 is a block diagram of a computer system with AI inferencing, according to aspects of the present disclosure.

DETAILED DESCRIPTION

Figure 1:
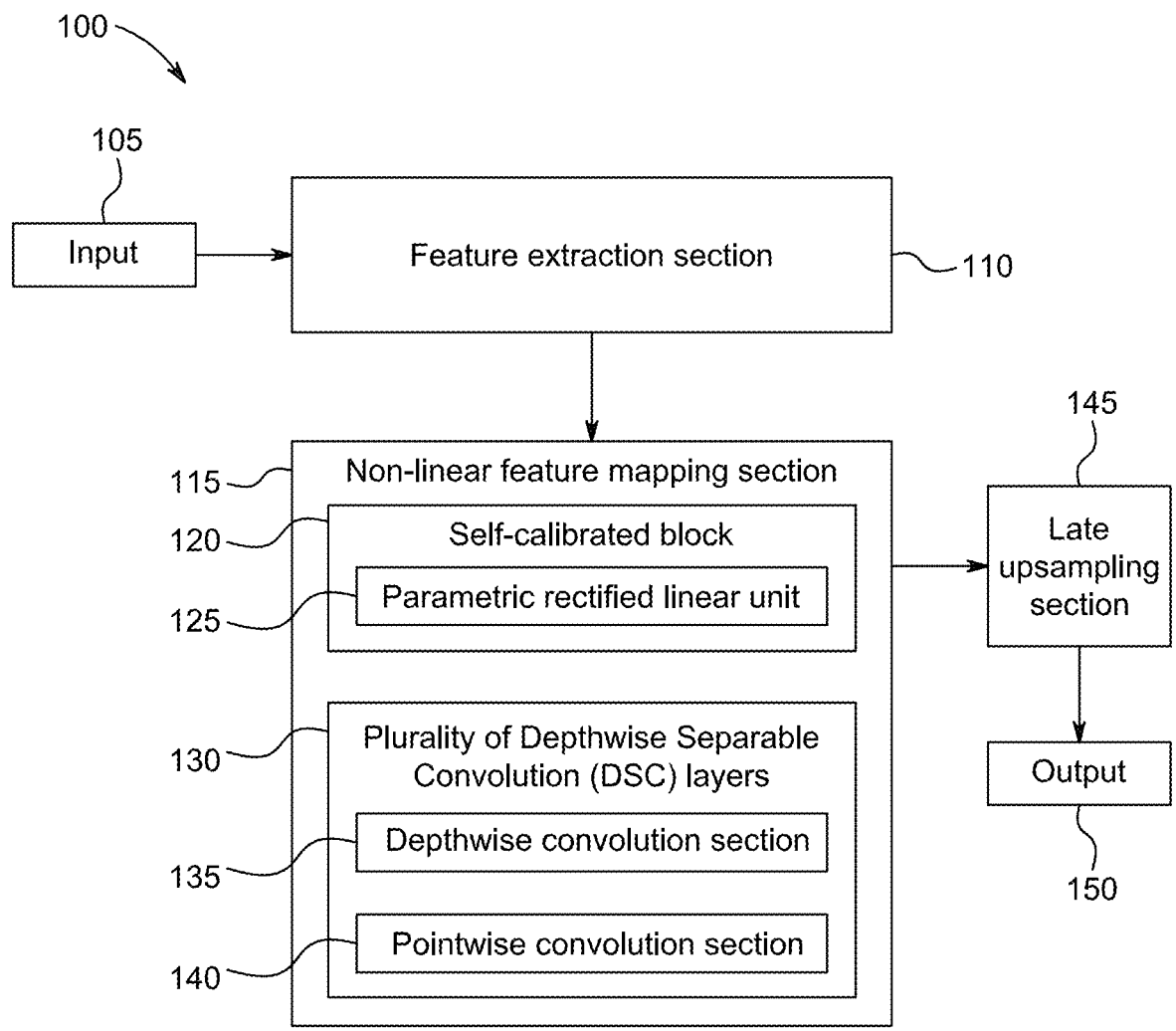
FIG. 1 illustrates a block diagram of a system for real-time image super-resolution, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system for real-time image super-resolution. The disclosure provides an accurate real-time super-resolution (SR) model, system, method and apparatus. The present system reduces a required number of multiply-accumulate operations (MACs) by performing all operations on low-dimensional feature maps and reducing the model parameters by extensive use of depthwise separable convolutional (DSC) layers. In particular, the disclosure discloses an efficient self-calibrated convolution with pixel attention (ESC-PA) to improve feature representation. Simulation results show that the disclosed system improves performance in objective metrics such as Peak Signal-to-Noise Ratio (PSNR) and structural similarity (SSIM) index, over conventional real-time SR models.

Furthermore, the network architecture and related functions in ESC-PAN, which includes a combination of self-calibrated convolutions, extensive use of DSC layers, and use of the PReLU activation function, enables a substantial reduction in complexity. As discussed in the present disclosure, at a scale factor of 4 times, the real-time SR model SSNet-M results in higher complexity than ESC-PAN. Furthermore, when the scale factor is increased to 8 times, ESC-PAN complexity is 9.2 k/0.023G, while SSNet-M is 14.1 k/0.044G Subsequently, ESC-PAN has potential for substantial scalability compared with other state-of-the-art real-time SR models, in particular SSNet-M.

In various aspects of the disclosure, non-limiting definitions of one or more terms that will be used in the document are provided below.

A term "Image super-resolution" or "super-resolution imaging" is a process for generating or recovering a high resolution (HR) image from a single low resolution (LR) image. The input is a blurred or LR image. The output is a high resolution image. As used herein, a high resolution image is a low resolution image that is increased in size by a scale factor.

Self-calibrated convolutions can be used in place of standard convolutions and explicitly expand fields-of-view of each convolutional layer through internal communications and hence enrich the output features. In particular, unlike the standard convolutions that fuse spatial and channel-wise information using small kernels (e.g., 3×3), self-calibrated convolutions adaptively build long-range spatial and inter-channel dependencies around each spatial location through a self-calibration operation.

In grouped convolutions, the feature transformation process is homogeneously and individually performed in multiple parallel branches and the outputs from each branch are concatenated as the final output. Similar to grouped convolutions, self-calibrated convolutions also split the learnable convolutional filters into multiple portions, yet differently, each portion of filters is not equally treated but responsible for a special functionality. Convolutional feature transformation is conducted in two different scale spaces: an original scale space in which feature maps share the same resolution with the input and a small latent space after down-sampling. The embeddings after transformation in the small latent space are used as references to guide the feature transformation process in the original feature space because of their large fields-of-view.

Depthwise Separable Convolution is based on the separation of depthwise convolution and pointwise convolution from standard convolution. Depthwise Convolution is a type of convolution where a single convolutional filter is applied for each input channel. In other words, depthwise convolutions keep each channel separate. Pointwise Convolution is a type of convolution that uses a 1×1 kernel: a kernel that iterates through every single point. This kernel has a depth of however many channels the input image has. Depthwise-separable convolution is the conjunction of pointwise convolution and depthwise convolution.

FIG. 1 illustrates a block diagram of a system 100 for real-time image super-resolution, according to one or more aspects of the present disclosure. Referring to FIG. 1, the system 100 includes an input 105, a feature extraction section 110, a non-linear feature mapping section 115, a late upsampling section 145 and an output 150.

The input 105 (also referred to as input unit 105) is configured to receive a low resolution image. In an aspect, the input 105 receives a low resolution image from a computing device. In one embodiment, the input unit 105 may be any computing device, such as a desktop computer, a laptop, a tablet computer, a smartphone, a mobile device, an image sensor, a Personal Digital Assistant (PDA), or any other computing device that has processing capabilities. In an aspect, the input unit 105 is configured to receive an image data such as a photo, an image, a video, or image information. In some embodiments, the input unit 105 is configured to pre-process the received low resolution image by employing various operations such as encoding, image down-scaling, splitting into single full-resolution frames, uncompressing, compressing, and grouping frames.

The feature extraction section 110 is co-operatively coupled with the input unit 105 and receives the low resolution image from the input unit 105. The feature extraction section 110 is configured to extract a plurality of features from the received low resolution image. In an aspect, the plurality of features may include, for example, RGB colors (that is, red, green, and blue colors), surface normals (in the x, y, and z directions), depth, albedo (reflectivity), their corresponding variances, and the like. In an operative aspect, the feature extraction section 110 may include a plurality of convolutional and a pair of pooling layers. The plurality of convolutional layer includes a series of digital filters to perform the convolution operation on the received low resolution image. A pooling layer first transforms neighboring pixels into a single pixel. The pooling layer then decreases the image dimension. The pooling layer is a dimensionality reduction layer and decides the threshold. In one embodiment, the operations of the convolution and pooling layers are based on a two-dimensional plane. During backpropagation, a number of parameters are required to be adjusted, which in turn minimizes the connections within neural network architecture. In an aspect, the plurality of features are utilized by the neural network for classification. The neural network performs classification on basis of the image features and produces the output.

The non-linear feature mapping section 115 is configured to represent the extracted plurality of features along with their relevancy, therefore excluding the irrelevant features. The non-linear feature mapping section 115 is configured to map the extracted features according to their relevancy to find out the correlation between the plurality of features and generates a set of relevant features. The non-linear feature mapping section 115 includes an efficient self-calibrated block with pixel attention (ESC-PA) 120. The ESC-PA 120 is configured to improve representation of the generated set of relevant features. The ESC-PA 120 is configured to produce a 3D attention map instead of a 1D attention vector or a 2D map.

In an operative aspect, the ESC-PA 120 of the non-linear feature mapping section 115 includes an upper convolution and a lower convolution. The upper convolution is employed for high-level feature manipulation. The lower convolution is configured to conserve original image information. In one embodiment, each of the upper convolution and the lower convolution has depthwise separable convolutional (DSC) layers.

The upper convolution includes a pixel attention (PA) block. The PA block includes a convolution layer that is configured to attain the 3D matrix of attention maps. In one embodiment, the PA block is configured to adaptively rescale each pixel-wise weight of all input feature maps.

Further, the ESC-PA 120 includes a parametric rectified linear unit (PReLU) 125, and a plurality of Depthwise Separable Convolution (DSC) layers 130.

The PReLU 125 is configured to function as an activation function. In a convolutional neural network, the activation function of a node defines the output of that node given for an input or set of inputs. The activation function is responsible for transforming a summed weighted input from a node into the activation of the node and defines the specific output or "activation" of the node. In an aspect, the PReLU 125 includes a parameter that is learned.

The plurality of DSC layers 130 is configured to reduce the number of computations that are being performed in each convolutional layer. In an aspect, the plurality of DSC layers 130 are 3×3 DSC layers. For example, the convolutional neural network (CNN) architecture has user-adjustable parameters that include one or more of: a number of the plurality of depthwise separable convolution layers, and a respective number of filters included in the depthwise convolution layer of each of the plurality of DSC layers 130.

In a structural aspect, each of the plurality of DSC layers 130 includes a depthwise convolution section 135 and a pointwise convolution section 140. The depthwise convolution section 135 applies an element-wise product to a convolution kernel and to each channel of input features independently. In the depthwise convolution section 135, each convolution kernel is applied to a single channel of the input and not all the input channels at once. Hence, each convolution kernel is of shape (w*h*1) since the convolution kernel would be applied to the single channel. The number of convolution kernels is equal to the number of input channels. For a W*H*3 size input, there are 3 (three) separate w*h*1 kernels, and each convolution kernel is applied to a single channel of the input. Thus the output includes the same number of channels as the input.

The pointwise convolution section 140 includes a kernel that iterates through every point. The pointwise convolution section 140 is configured change the number of channels, as it is required to increase the number of channels such that each layer has as an output as the CNN grows deeper.

In an operative aspect, the process of the DSC layers may be described in two steps. In a first step of the depthwise convolution, during the depthwise convolution section 135, there is one (1) convolution kernel for each input channel and convolution kernel is applied to the input. The resultant output of the depthwise convolution section 135 is a feature map block with the same number of channels as the input. In a second step of the pointwise convolution, there are several 1×1 convolution kernels and these convolution kernels combined with the intermediate feature map block. In an aspect, the number of kernels can be chosen according to the number of output channels.

The late upsampling section 145 is configured to combine at least one DSC layer and a skip connection that upsamples (a process of expansion and filtering (interpolation)) to a desired dimension. In one embodiment, the late upsampling section 145 is configured to increase the spatial area by introducing more pixels in the feature map before applying convolutions.

In an aspect, the late upsampling section 145 also includes a pixel attention block having a convolution layer to attain a 3D matrix of attention maps. For instance, the late upsampling section 145 may be constructed using bilinear or longer filters.

The skip connection is configured with a bicubic interpolation function to upsample the low resolution image to a desired dimension. The bicubic interpolation is an extension of cubic interpolation for interpolating data points on a two-dimensional regular grid. The bicubic interpolation function is configured to sharpen and enlarge a digital image. The output of the bicubic interpolation function is added to the output to produce the super-resolution image.

The output 150 (also referred to as output unit 150) is communicatively coupled to the late upsampling section 145 and receives the produced super-resolution image from the late upsampling section 145. The output unit 150 is configured to display an approximate upsampled super-resolution image that corresponds to the low resolution image. In an aspect, the output unit 150 is selected from a group of display units consisting of a television, a digital billboard, a computer monitor, a laptop monitor, a game console, a cell phone with a display, a camera display, a personal digital assistant (PDA), and a smartphone with a display. In one embodiment, the output 150 is configured to transmit directly to a display or may be stored for viewing on a display on a local or remote storage device, or forwarded to a remote node for storage or viewing as required.

In an aspect, the system 100 may include a circuitry including a memory storing program instructions and a processor(s) configured to perform the program instructions. The memory includes a training set of training images and validation images. According to an aspect of the present disclosure, the processor may be implemented as one or more microprocessors, microcomputers, microcontrollers, digital signal processors, central processing units, state machines, logic circuitries, and/or any devices that manipulate signals based on operational instructions. Among other capabilities, the processor may be configured to fetch and execute computer-readable instructions stored in the memory. The memory may be coupled to the processor and may include any computer-readable medium known in the art including, for example, volatile memory, such as static random access memory (SRAM) and dynamic random access memory (DRAM) and/or nonvolatile memory, such as read only memory (ROM), erasable programmable ROM, flash memories, hard disks, optical disks, and magnetic tapes.

Figure 2:
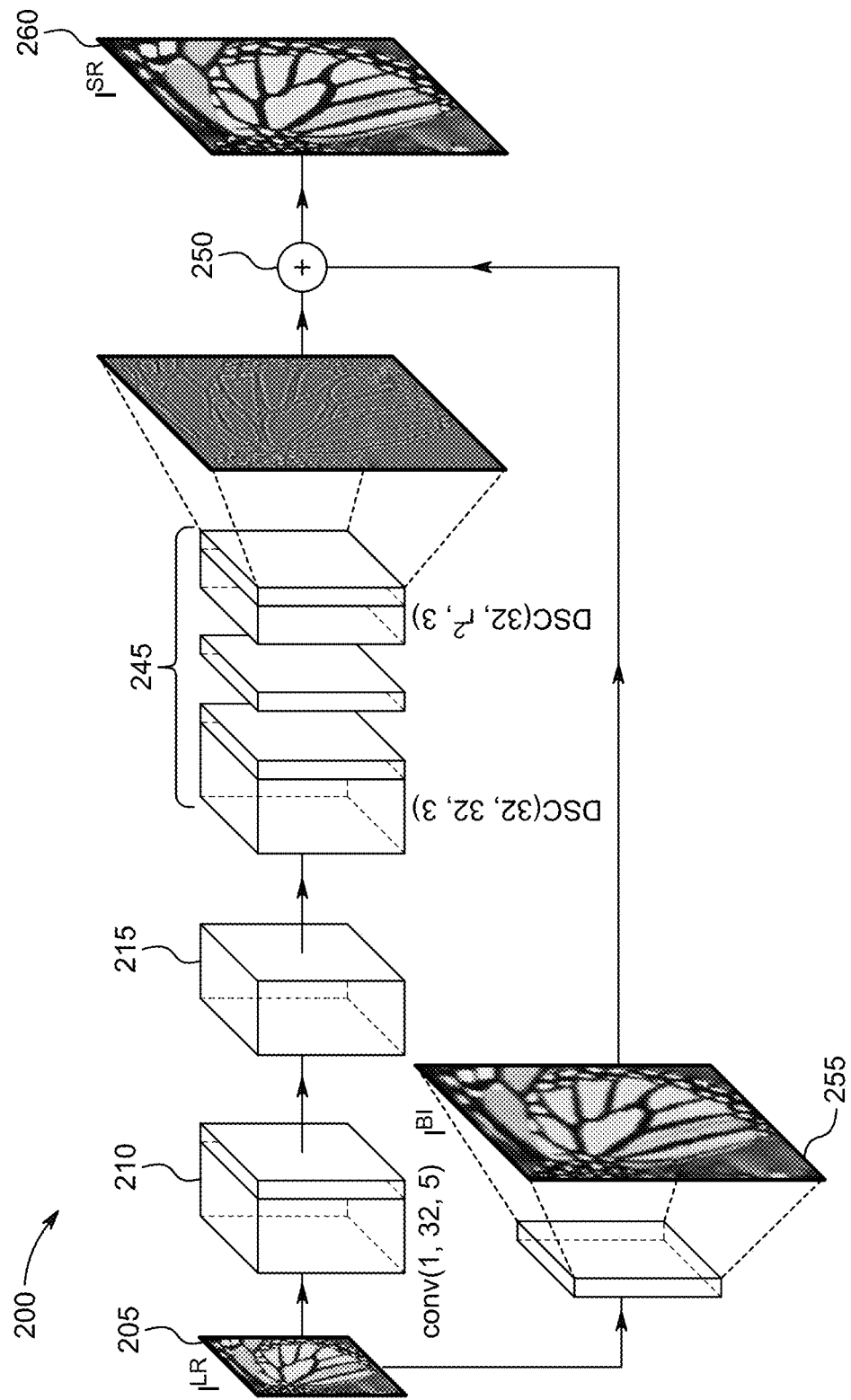
FIG. 2 illustrates an architecture of a convolutional neural network (CNN) model performing real-time image super-resolution, according to aspects of the present disclosure.

FIG. 2 illustrates an architecture of a convolutional neural network (CNN) model 200 performing real-time image super-resolution, according to aspects of the present disclosure. As shown in FIG. 2, the CNN model 200 includes an input 205, a feature extraction section 210, a non-linear feature mapping section 215, a late upsampling section 245, an element wise addition section 250, a skip connection 255, and an output 260.

The input 205 is configured to receive a low resolution image $I^{LR}$. In an aspect, the input 205 co-operatively coupled to a computing device and receives the low resolution image. The computing device may be any device, such as a desktop computer, a laptop, a tablet computer, a smartphone, a camera, a mobile device, or a Personal Digital Assistant (PDA). The feature extraction section 210 is configured to extract features from the received low resolution image. As shown in FIG. 2, the feature extraction section 210 includes a single standard convolutional layer, conv(1, 32, 5), where 1 is the number of input channels, 32 is the number of output channels, and 5 is the kernel size. In one embodiment, the input channel is set to 1 since all operations is carried out on grayscale images. In an operative aspect, the feature extraction section 210 is configured to apply filters or feature detectors to the received image to generate the feature maps or the activation maps using a Parametric Rectified Linear Unit (PReLU) activation function. The PReLU activation function results an output that equals the input for all positive inputs, and zero for all others. Feature detectors or filters help identify different features present in an image like edges, vertical lines, horizontal lines, bends, etc.

The non-linear feature mapping section 215 is configured to map/represent the extracted features along with the relevancy of these features, therefore excluding the irrelevant features. In an aspect, the non-linear feature mapping section 215 includes a self-calibrated block with pixel attention (ESC-PA). The ESC-PA is configured to produce 3D attention maps instead of a 1D attention vector or a 2D map. As shown in FIG. 2, all activation functions of ESC-PA are replaced with the PReLU activation function. Further, the non-linear feature mapping section 215 is configured to replace all the 3×3 standard convolutional layers with 3×3 DSC layers to improve efficiency.

The late upsampling section 245 is configured to upsample the image to a desired dimension. As shown in FIG. 2, the late upsampling section 245 includes a DSC layer (32, 32, 3), a pixel attention (PA block), and a DSC layer (32, $r^2$, 3). In an operative aspect, the DSC layer (32, 32, 3) is followed by the PA block. Further, the PA block is followed by the DSC layer (32, $r^2$, 3). Lastly, the DSC layer (32, $r^2$, 3) is followed by a pixel shuffling operator.

The skip connection 255 is configured with a bicubic interpolation function to upsample the input $I^{LR}$ to the desired dimension. The skip connection 255 generates an image, known as $I^{BI}$ using the bicubic interpolation function. The element wise addition section 250 is configured to add to the output of the late upsampling section 245 with the output of the skip connection 255 $I^{BI}$ to produce the output image $I^{SR}$.

The output 260 is configured to display an approximate upsampled super-resolution image $I^{SR}$ that corresponds to the low resolution image $I^{LR}$.

In principle, the CNN model (ML model) 200 is a model which created by the ML and may be trained in a training section based on a set of labelled training data. After the training section, the CNN model is configured to apply the learning to the received low resolution images. The training section is configured to cooperate with the memory to receive information related to the stored images. The training section trains one or more machine learning models using the training set obtained from the memory. As is known, before a neural network can be used for a task (e.g., classification, regression, image reconstruction, etc.), the neural network is trained to extract features through many layers (convolutional, recurrent, pooling, etc.). The neural network becomes (e.g., learns) a function that projects (e.g., maps) the image on the latent space. In other words, the latent space is the space where the features lie. The latent space contains a compressed representation of the image. This compressed representation is then used to reconstruct an input, as faithfully as possible. To perform well, a neural network has to learn to extract the most relevant features (e.g., the most relevant latent space).

Figure 3:
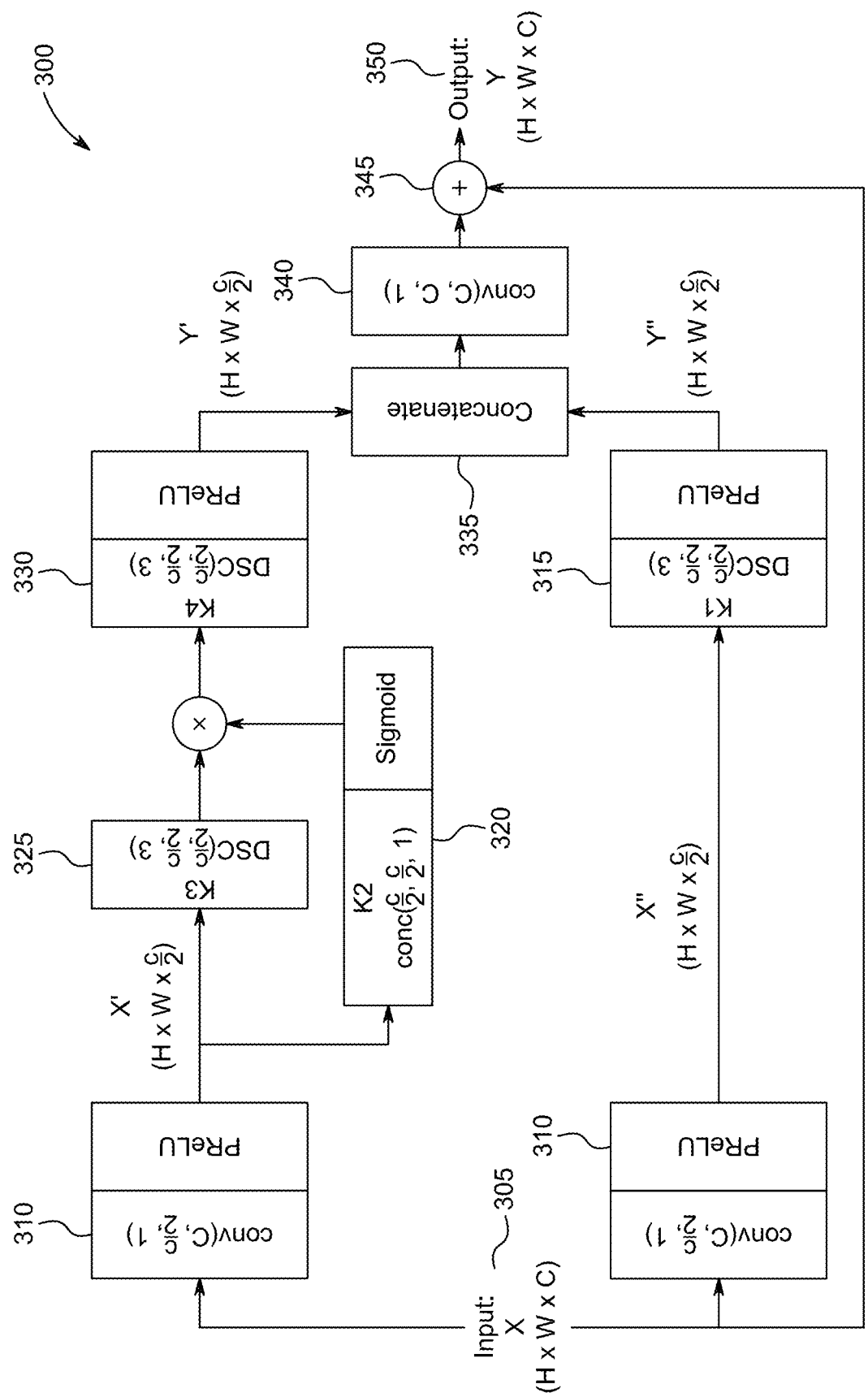
FIG. 3 represents a block diagram of an efficient self-calibrated block with pixel attention (ESC-PA), according to aspects of the present disclosure.

FIG. 3 represents a block diagram of an efficient self-calibrated block with a pixel attention (ESC-PA) block 300, according to aspects of the present disclosure.

As shown in FIG. 3, the pixel attention ESC-PA block 300 includes convolutional layers (310, 320, 340), DSC layers (315, 325, 330), a concatenate block 335, a summation block 345 and an output 350. All layers in the ESC-PA block 300 are activated with a PReLU activation.

The ESC-PA block 300 is configured to perform various measures to reduce the number of features. The ESC-PA block 300 is configured to ensure that the features are visualized, and their corresponding information is visually available, thereby excluding the irrelevant features. Each feature in a dataset is considered as a node of an undirected graph. Some of these features are irrelevant and need to be processed to detect their relevancy in learning, whether supervised learning or unsupervised learning. For example, a Pearson's correlation coefficient determines the correlation between two features and hence how related they are. If two features contribute the same information, then one of them is considered potentially redundant. Thus, the optimal set of features is relevant with no redundancy and can contribute information to the original dataset. Reducing the number of features not only decreases the time complexity but also enhances the accuracy of the classification or clustering. The convolutional layers 310 are configured to receive an input (image) X having dimensions (H×W×C). Each of the convolutional layers 310 is activated with the PReLU activation function. The PReLU activation function results an output that equals the input for all positive inputs, and zero for all others. The plurality of convolutional layers 310 is configured to generate an output X' having dimensions $$(H \times W \times \frac{C}{2}),$$

and an output X" having dimensions $$(H \times W \times \frac{C}{2})$$

as shown in FIG. 3. The convolutional layer $$(\frac{C}{2} \times \frac{C}{2} \times 1) \ 320$$

is further configured to receive an input X' having dimensions $$(H \times W \times \frac{C}{2})$$

from the convolutional layer 310. The convolutional layer 320 is activated by a Sigmoid activation function and generates an output.

The DSC layers (315, 325) are configured to receive an input from each of the convolutional layers $$(C \times \frac{C}{2} \times 1) \ 310.$$

The DSC layer $$(\frac{C}{2} \times \frac{C}{2} \times 3) \ 315$$

receives an input X" having dimensions $$(H \times W \times \frac{C}{2})$$

from the convolutional layer 310 as shown in FIG. 3. The DSC layer $$(\frac{C}{2} \times \frac{C}{2} \times 3) \ 315$$

is activated by the PReLU activation function and generates an Y" having dimensions $$(H \times W \times \frac{C}{2}).$$

The DSC layer $$(\frac{C}{2} \times \frac{C}{2} \times 3) \ 325$$

receives the input X' having dimensions $$(H \times W \times \frac{C}{2})$$

from the convolutional layer 310. The output generated by the DSC layer $$(\frac{C}{2} \times \frac{C}{2} \times 3) \ 330$$

is multiplied with the output generated by the convolutional layer 320. Further, the multiplied result is inputted into DSC layer $$(\frac{C}{2} \times \frac{C}{2} \times 3) \ 325$$

The DSC layer $$(\frac{C}{2} \times \frac{C}{2} \times 3) \ 330.$$

is activated by the PReLU activation function and generates an Y' having dimensions $$(H \times W \times \frac{C}{2}).$$

The concatenate block 335 is configured to receive the input Y' from the DSC layer 330 and receive the input Y"DSC layer 315. The concatenate block 335 is configured to join the received inputs to generate a concatenated output. The convolutional layer (c×c×1) 340 is further configured to receive the concatenated output from the concatenate block 335 as an input.

The summation block 345 is configured to receive the output from the convolutional layer 340 as an input and the input (image) X having dimensions (H×W×C). The summation block 345 is configured to sum the received inputs and generate an output Y having dimensions (H×W×C).

The output 350 is configured to receive the generated output Y from the summation block 345 and display the output that is an approximately upsampled super-resolution image that corresponds to the low resolution image.

Examples and Experiments

The following examples are provided to illustrate further and to facilitate the understanding of the present disclosure.

Experimental Data and Analysis

The performance of the present system 100 is compared with the conventional real-time SR systems in terms of complexity and objective metrics, namely, Peak Signal-to-Noise Ratio (PSNR) and Structural Similarity index (SSIM).

Peak Signal to Noise Ratio (PSNR) is generally defined as the ratio between the maximum possible power of an image and the power of corrupting noise that affects the quality of its representation.

Structural similarity index (SSIM index) is a perception-based model that considers image degradation as a perceived change in structural information, while also incorporating important perceptual phenomena. Structural information is the idea that the pixels have strong inter-dependencies especially when they are spatially close. These dependencies carry important information about the structure of the objects in the visual scene. Unlike PSNR, which measures the quality pixel-wise, SSIM index considers local image structures using spatial domain local statistics, such as mean, variance, and covariance between the reconstructed $I^{SR}$ and its corresponding ground truth $I^{HR}$. SSIM formulation consists of three individual comparison functions. Each comparison function tries to estimate one of the following, luminance (l) that depends on the mean, contrast (c) that depends on the variance, and structure (s) that depends on the covariance.

All of the experiments were conducted on a Lambda workstation with AMD Ryzen Threadripper 3960X 24-Core Processor @ 3.8 GHz, 64 GB RAM, NVIDIA GeForce RTX 3090 GPU, Ubuntu 20.04.3, and PyTorch 1.9.0. For example, in the present system 100 the multiply-accumulate operations (MACs) are calculated for a target image (upsampled super-resolution image) of size 540×360.

In the present system 100, a DIV2K dataset was used to train and validate the model. DIV2K is a single-image super-resolution dataset which contains 1,000 images with different scenes. The DIV2K dataset was collected for NTIRE2017 and NTIRE2018 Super-Resolution Challenges in order to encourage research on image super-resolution with more realistic degradation. The DIV2K dataset includes low resolution images with different types of degradation. DIV2K dataset includes 1000 high-resolution images with minimal noise. The DIV2K dataset contains at least 2K pixels in either its vertical or horizontal dimension. In the present experiments, 800 training images and 100 validation images from the DIV2K dataset were used. For testing the CNN model 200, the CNN model 200 was evaluated on the five benchmark SR testing datasets: Set5 which contains five uncompressed images; Set14 which is an extension of Set5 that contains a larger variety of images; BSD100, which contains 100 images that are mostly natural scenery and people; Urban100 which contains 100 images of urban man-made structures that are rich with details and edges; and Manga109 which contains 109 manga volume hand-drawn cover images.

Training of the CNN model 200:

During the training phase, the training dataset was sliced into 120×120 patches and flipped vertically and horizontally in a random fashion. Then the flipped training dataset was downsampled using a bicubic resampling to generate an $I^{LR}$ input image. The validation dataset was used in full dimensions with no augmentation. l1 loss was used during training and the PSNR of the validation set was monitored. During the training section, the CNN model with the highest validation PSNR was saved. In an aspect, an Adam optimizer was used with $\alpha_1=0.9$, $\beta_2=0.999$, $\epsilon=10^{-8}$, and an initial learning rate of $10^{-3}$. The learning rate decays by a factor of 0.75 if the validation PSNR plateaus for 20 epochs and stops decaying at $10^{-4}$. For example, all operations were done on the Y channel of the YCbCr.

Table 1 summarizes a study to examine the effectiveness of each of the adopted techniques (DSC layers, PA block, and late upsampling) employed in the present system 100. Table 1 summarizes a comparison including the complexity and PSNR performance on the DIV2K validation dataset for ×4 SR. The last row in Table 1 is the present system. The present system 100 is configured to employ an efficient self-calibrated pixel-attention network (ESC-PAN). For standard convolution, validation PSNR is higher than the described ESC-PAN by 0.1 dB. It is also evident that when removing PA block, the parameters, and MACs of the CNN model 200 were reduced by around 16-17%, but at the cost of 0.1 dB performance. Finally, the adoption of late upsampling was beneficial in both reducing MACs and improving performance, as early upsampling used in the conventional systems increased MACs significantly at worse performance. The late upsampling came at a small cost in increasing the number of parameters due to the convolutional layer before the pixel shuffling operator. The improvement is 0.1 dB when using PA block at the cost of around 1.3 k parameters. However, the next 0.1 dB comes at the cost of around 17.4 k parameters for standard convolutional layers.

TABLE 1

Study summary for scale ×4

| Conv Layer Type | Pixel Attention | Upsampling Method | Complexity Params./MACs | Validation Set PSNR |
|---|---|---|---|---|
| Standard Conv | With | Late | 25.0 k/0.304 G | 27.65 dB |
| DSC | Without | Late | 6.3 k/0.077 G | 27.45 dB |
| DSC | With | Early | 7.1 k/22.199 G | 27.37 dB |
| DSC | With | Late | 7.6 k/0.093 G | 27.55 dB |

The summary of the performance comparison of the present system 100 with real-time existing SR models on the test datasets as well as model complexity is presented in Table 2 for scales ×2, ×3, and ×4. For the present system 100, the result was reproduced since its evaluation was not reported for all datasets and scales, and the generated values for the parameters and MACs are shown in Table 2.

TABLE 2

Objective evaluation for real-time existing SR models for scales ×2, ×3, and ×4.

| | Method | Complexity Params./MACs | Set5 PNSR/SSIM | Set14 PNSR/SSIM | BSD100 PNSR/SSIM | Urban 100 PNSR/SSIM | Manga109 PNSR/SSIM |
|---|---|---|---|---|---|---|---|
| Scale ×2 | Bicubic | —/— | 33.68/0.930 | 30.24/0.869 | 29.56/0.844 | 26.88/0.841 | 31.05/0.935 |
| | SRCNN | 57.3k/11.135G | 36.66/0.954 | 32.45/0.907 | 31.36/0.888 | 29.51/0.895 | 35.72/0.968 |
| | FSRCNN | 12.6k/1.276G | 36.98/0.956 | 32.62/0.909 | 31.50/0.890 | 29.85/0.901 | 36.62/0.971 |
| | ESPCN | 21.3k/1.034G | 37.04/0.957 | 32.62/0.909 | 31.50/0.891 | 29.82/0.900 | 36.31/0.970 |
| | SSNet-M | 6.2k/0.303G | 37.08/0.956 | 32.78/0.908 | 31.46/0.900 | 29.92/0.900 | 36.47/0.970 |
| | ESC-PAN (present disclosure) | 7.2k/0.352G | 37.40/0.959 | 32.84/0.911 | 31.70/0.894 | 30.31/0.908 | 36.93/0.973 |

TABLE 2-continued

Objective evaluation for real-time existing SR models for scales ×2, ×3, and ×4.

| | Method | Complexity Params./MACs | Set5 PNSR/SSIM | Set14 PNSR/SSIM | BSD100 PNSR/SSIM | Urban 100 PNSR/SSIM | Manga109 PNSR/SSIM |
|---|---|---|---|---|---|---|---|
| Scale ×3 | Bicubic | —/— | 30.40/0.869 | 27.54/0.774 | 27.21/0.739 | 24.46/0.735 | 26.95/0.856 |
| | SRCNN | 57.3k/11.135G | 32.75/0.909 | 29.29/0.822 | 28.41/0.786 | 26.24/0.799 | 30.48/0.912 |
| | FSRCNN | 12.6k/1.057G | 33.16/0.914 | 29.42/0.824 | 28.52/0.789 | 26.41/0.806 | 31.10/0.921 |
| | ESPCN | 22.7k/0.491G | 33.01/0.913 | 29.39/0.823 | 28.45/0.788 | 26.28/0.801 | 30.77/0.914 |
| | SSNet-M | 6.9k/0.150G | 33.24/0.915 | 29.51/0.824 | 28.42/0.788 | 26.44/0.805 | 31.01/0.918 |
| | ESC-PAN (present disclosure) | 7.4k/0.160G | 33.35/0.918 | 29.58/0.828 | 28.62/0.792 | 26.65/0.814 | 31.34/0.926 |
| Scale ×4 | Bicubic | —/— | 28.43/0.811 | 26.00/0.702 | 25.96/0.668 | 23.14/0.657 | 25.15/0.789 |
| | SRCNN | 57.3k/11.135G | 30.48/0.863 | 27.50/0.751 | 26.90/0.710 | 24.52/0.723 | 27.66/0.858 |
| | FSRCNN | 12.6k/0.980G | 30.70/0.866 | 27.59/0.754 | 26.96/0.713 | 24.60/0.726 | 27.89/0.859 |
| | ESPCN | 24.8k/0.301G | 30.69/0.866 | 27.58/0.754 | 26.95/0.714 | 24.54/0.722 | 27.72/0.853 |
| | SSNet-M | 7.8k/0.096G | 31.01/0.873 | 27.61/0.755 | 26.84/0.710 | 24.62/0.725 | 27.87/0.858 |
| | ESC-PAN (present disclosure) | 7.6k/0.093G | 31.02/0.876 | 27.78/0.762 | 27.11/0.719 | 24.81/0.737 | 28.30/0.873 |

The complexity for each model and scale is illustrated in the second column in Table 2. The complexity of the present system 100 is similar to S SNet-M and both have the least complexity when compared with the rest of the considered real-time SR models. While the parameters of the present system 100, grows around 0.4 k from scale ×2 to ×4 due to the SS (super sampling) technique and for SSNet-M, parameters grow around 1.6 k.

At scale ×4, SSNet-M results in higher complexity than the present system 100 (ESC-PAN). Furthermore, if scale factor is increased to ×8, the present system 100 complexity would be 9.2 k/0.023G, while SSNet-M would be 14.1 k/0.044G. In this case, the difference in scalability between the two models becomes more noticeable.

Regarding objective performance on the five benchmark SR testing datasets, the present system 100 outperforms all other real-time SR models across all test datasets with respectable margins in both PSNR and SSIM. The margins are more noticeable in more difficult datasets such as Urban100 and BSD100, and especially highest for Manga109 for all scales. However, it is worthy to note that the present system 100 results better in PSNR for SSIM of BSD100 in the scale ×2 to SSNet-M.

The present disclosure describes an efficient super-resolution model (ESC-PAN) for real-time applications. The described CNN model 200 improves the efficiency by using depthwise separable convolution throughout the model 200 to reduce the model parameters, especially in the self-calibrated convolution with pixel attention block. Multiply-accumulate operations are reduced as well, and this is due to limiting operations to low-dimensional feature maps. The experiments showed that the ESC-PAN proposes a decent compromise between objective performance and complexity. Experimental results showed that ESC-PAN produces superior performance in terms of PSNR and SSIM on the five benchmark super-resolution datasets when compared with similar complexity real-time super-resolution models.

The present disclosure is configured to provide real-time image super-resolution that increases the performance of digital image processing techniques. The present disclosure is employable in modern digital communication that includes many applications that generate data in the form of images and videos. The present disclosure is applicable to a wide range of applications that require real-time operation, including satellite image processing, medical image processing, microscopy image processing, the multimedia industry, video enhancement, and astrological studies. The present disclosure is configured to be employed in a system related to surveillance to detect, identify, and perform facial recognition on low-resolution images obtained from security cameras to enhance the accuracy of the system.

As the real-time image super-resolution is capable of reducing server costs, the present system is deployable in various applications related to media where files can be sent at a lower resolution and upscaled on an other end. Aside from these applications, the present disclosure could be used in object detection, the automotive industry, real-time processing, scanning, surveillance, military, and forensics. In one sense, the current disclosure is useful in areas that require extremely high resolution images, such as 4K, 8K, and beyond.

An embodiment is illustrated with respect to FIGS. 1-3. The embodiment describes the system 100 for real-time image super-resolution. The system 100 includes the input 105 for receiving the low resolution image, the feature extraction section 110, the non-linear feature mapping section 115 including a self-calibrated block with pixel attention 120 having a plurality of Depthwise Separable Convolution (DSC) layers 130, the late upsampling section 145 combines at least one DSC layer and a skip connection that upsamples to a desired dimension, and the output 150 for displaying an approximate upsampled super-resolution image that corresponds to the low resolution image.

In an aspect of the present disclosure, the self-calibrated block with pixel attention 120 includes a parametric rectified linear unit 125 as an activation function, wherein the parametric rectified linear unit includes a parameter that is learned.

In an aspect of the present disclosure, each of the plurality of Depthwise Separable Convolution layers 130 includes a depthwise convolution section and a pointwise convolution section, where the depthwise convolution section applies an element-wise product to a convolution kernel and to each channel of input features independently and the pointwise convolution section includes a kernel that iterates through every point.

In an aspect, the self-calibrated block with pixel attention 120 of the non-linear feature mapping section includes an upper convolution for high-level feature manipulation and a lower convolution to conserve original image information, wherein the upper convolution and the lower convolution each have the DSC layers.

In an aspect of the present disclosure, the upper convolution includes a pixel attention block having a convolution layer to attain a 3D matrix of attention maps.

In an aspect of the present disclosure, the plurality of Depthwise Separable Convolution (DSC) layers 130 are 3×3 DSC layers.

In an aspect of the present disclosure, the late upsampling section 145 includes a pixel attention block having a convolution layer to attain a 3D matrix of attention maps.

In an aspect of the present disclosure, the skip connection upsamples the low resolution image to a desired dimension using bicubic interpolation, which is added to the output to produce the super-resolution image.

Next, further details of the hardware description of the computing environment of FIG. 1 according to exemplary embodiments is described with reference to FIG. 4.

Figure 4:
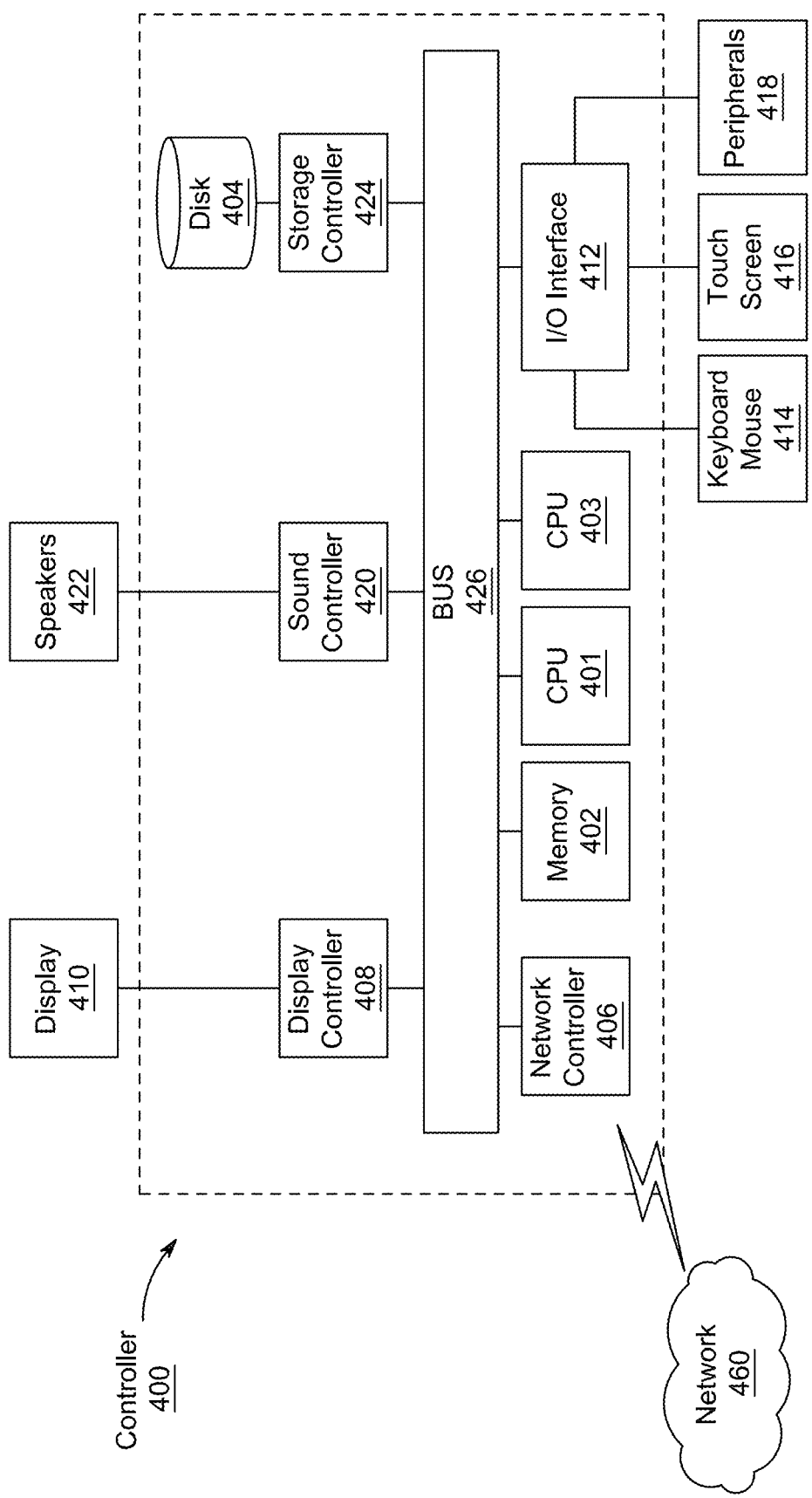
FIG. 4 is an illustration of a non-limiting example of details of computing hardware used in the computing system, according to aspects of the present disclosure.

In FIG. 4, a controller 400 is described is representative of the system 100 of FIG. 1 in which the controller is a computing device which includes a CPU 401 which performs the processes described above/below.

FIG. 4 is an illustration of a non-limiting embodiment of details of computing hardware used in the computing system, according to exemplary aspects of the present disclosure. In FIG. 4, a controller 400 is described which is a computing device (that includes, input and the CNN model 200) and includes a CPU 401 which performs the processes described above/below. The process data and instructions may be stored in memory 402. These processes and instructions may also be stored on a storage medium disk 404 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 401, 403 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 401 or CPU 403 may be a Xenon or Core processor from Intel of America or an Opteron processor from AMD of America, or may be other processor types that would be recognized by one of ordinary skill in the art. Alternatively, the CPU 401, 403 may be implemented on an FPGA, ASIC, PLD or using discrete logic circuits, as one of ordinary skill in the art would recognize. Further, CPU 401, 403 may be implemented as multiple processors cooperatively working in parallel to perform the instructions of the inventive processes described above.

The computing device in FIG. 4 also includes a network controller 406, such as an Intel Ethernet PRO network interface card from Intel Corporation of America, for interfacing with network 460. As can be appreciated, the network 460 can be a public network, such as the Internet, or a private network such as an LAN or WAN network, or any combination thereof and can also include PSTN or ISDN subnetworks. The network 460 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 408, such as a NVIDIA GeForce GTX or Quadro graphics adaptor from NVIDIA Corporation of America for interfacing with display 410, such as a Hewlett Packard HPL2445w LCD monitor. A general purpose I/O interface 412 interfaces with a keyboard and/or mouse 414 as well as a touch screen panel 416 on or separate from display 410. General purpose I/O interface also connects to a variety of peripherals 418 including printers and scanners, such as an OfficeJet or DeskJet from Hewlett Packard.

A sound controller 420 is also provided in the computing device such as Sound Blaster X-Fi Titanium from Creative, to interface with speakers/microphone 422 thereby providing sounds and/or music.

The general-purpose storage controller 424 connects the storage medium disk 404 with communication bus 426, which may be an ISA, EISA, VESA, PCI, or similar, for interconnecting all of the components of the computing device. A description of the general features and functionality of the display 410, keyboard and/or mouse 414, as well as the display controller 408, storage controller 424, network controller 406, sound controller 420, and general purpose I/O interface 412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 5.

Figure 5:
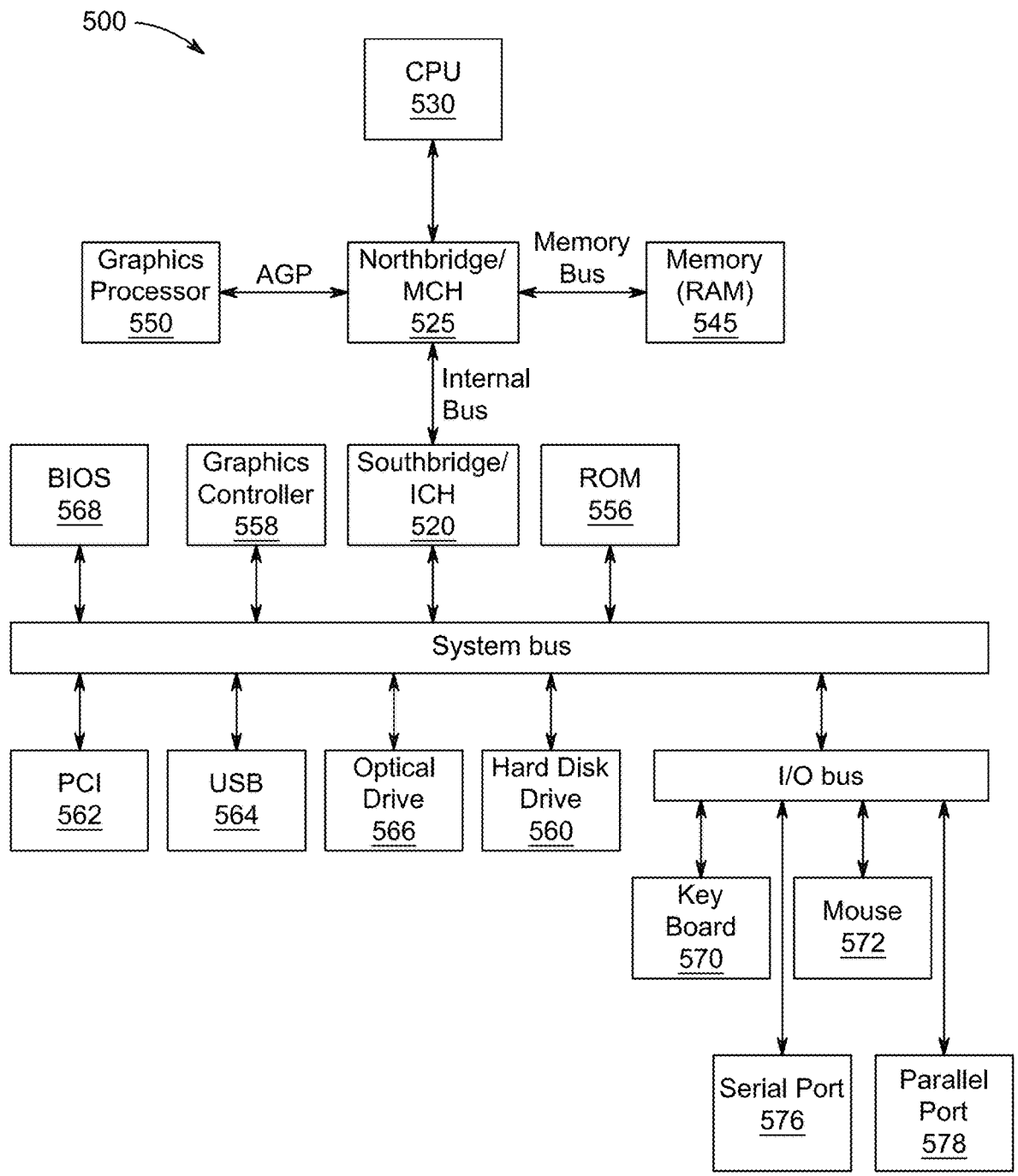
FIG. 5 is an exemplary schematic diagram of a data processing system used within the computing system, according to aspects of the present disclosure.

FIG. 5 shows a schematic diagram of a data processing system 500 used within the computing system, according to exemplary aspects of the present disclosure. The data processing system 500 is an example of a computer in which code or instructions implementing the processes of the illustrative aspects of the present disclosure may be located.

In FIG. 5, data processing system 580 employs a hub architecture including a north bridge and memory controller hub (NB/MCH) 525 and a south bridge and input/output (I/O) controller hub (SB/ICH) 520. The central processing unit (CPU) 530 is connected to NB/MCH 525. The NB/MCH 525 also connects to the memory 545 via a memory bus, and connects to the graphics processor 550 via an accelerated graphics port (AGP). The NB/MCH 525 also connects to the SB/ICH 520 via an internal bus (e.g., a unified media interface or a direct media interface). The CPU Processing unit 530 may contain one or more processors and even may be implemented using one or more heterogeneous processor systems.

Figure 6:
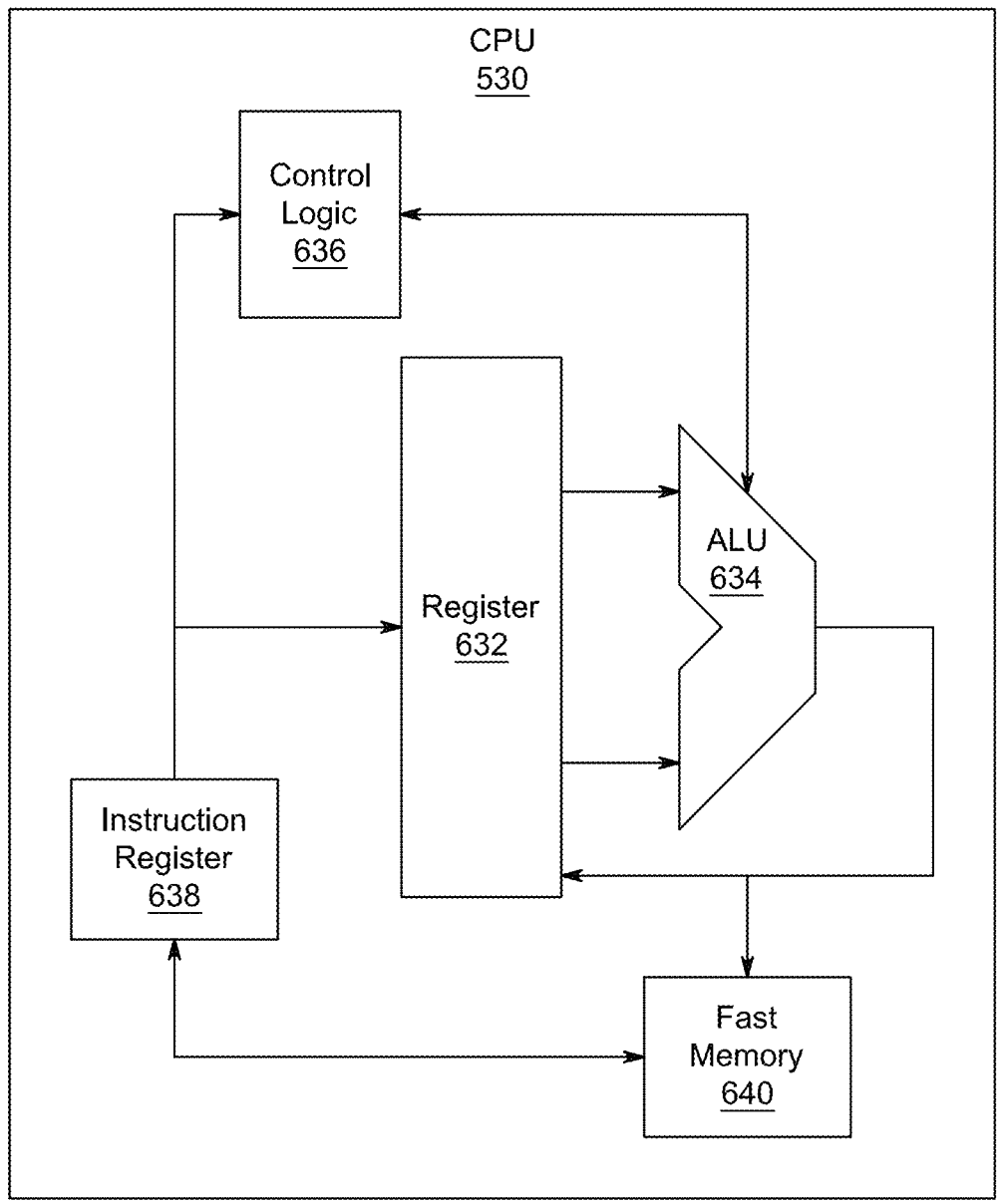
FIG. 6 is an exemplary schematic diagram of a processor used with the computing system, according to aspects of the present disclosure.

For example, FIG. 6 shows one aspects of the present disclosure of CPU 530. In one aspects of the present disclosure, the instruction register 638 retrieves instructions from the fast memory 640. At least part of these instructions is fetched from the instruction register 638 by the control logic 636 and interpreted according to the instruction set architecture of the CPU 530. Part of the instructions can also be directed to the register 632. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 634 that loads values from the register 632 and performs logical and mathematical operations on the loaded values according to the instructions. The results from these operations can be feedback into the register and/or stored in the fast memory 640. According to certain aspects of the present disclosures, the instruction set architecture of the CPU 530 can use a reduced instruction set architecture, a complex instruction set architecture, a vector processor architecture, a very large instruction word architecture. Furthermore, the CPU 530 can be based on the Von Neuman model or the Harvard model. The CPU 530 can be a digital signal processor, an FPGA, an ASIC, a PLA, a PLD, or a CPLD. Further, the CPU 530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 5, the data processing system 580 can include that the SB/ICH 520 is coupled through a system bus to an I/O Bus, a read only memory (ROM) 556, universal serial bus (USB) port 564, a flash binary input/output system (BIOS) 568, and a graphics controller 558. PCI/PCIe devices can also be coupled to SB/ICH 520 through a PCI bus 562.

The PCI devices may include, for example, Ethernet adapters, add-in cards, and PC cards for notebook computers. The Hard disk drive 560 and CD-ROM 556 can use, for example, an integrated drive electronics (IDE) or serial advanced technology attachment (SATA) interface. In one aspects of the present disclosure the I/O bus can include a super I/O (SIO) device.

Further, the hard disk drive (HDD) 560 and optical drive 566 can also be coupled to the SB/ICH 520 through a system bus. In one aspects of the present disclosure, a keyboard 570, a mouse 572, a parallel port 578, and a serial port 576 can be connected to the system bus through the I/O bus. Other peripherals and devices that can be connected to the SB/ICH 520 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 7:
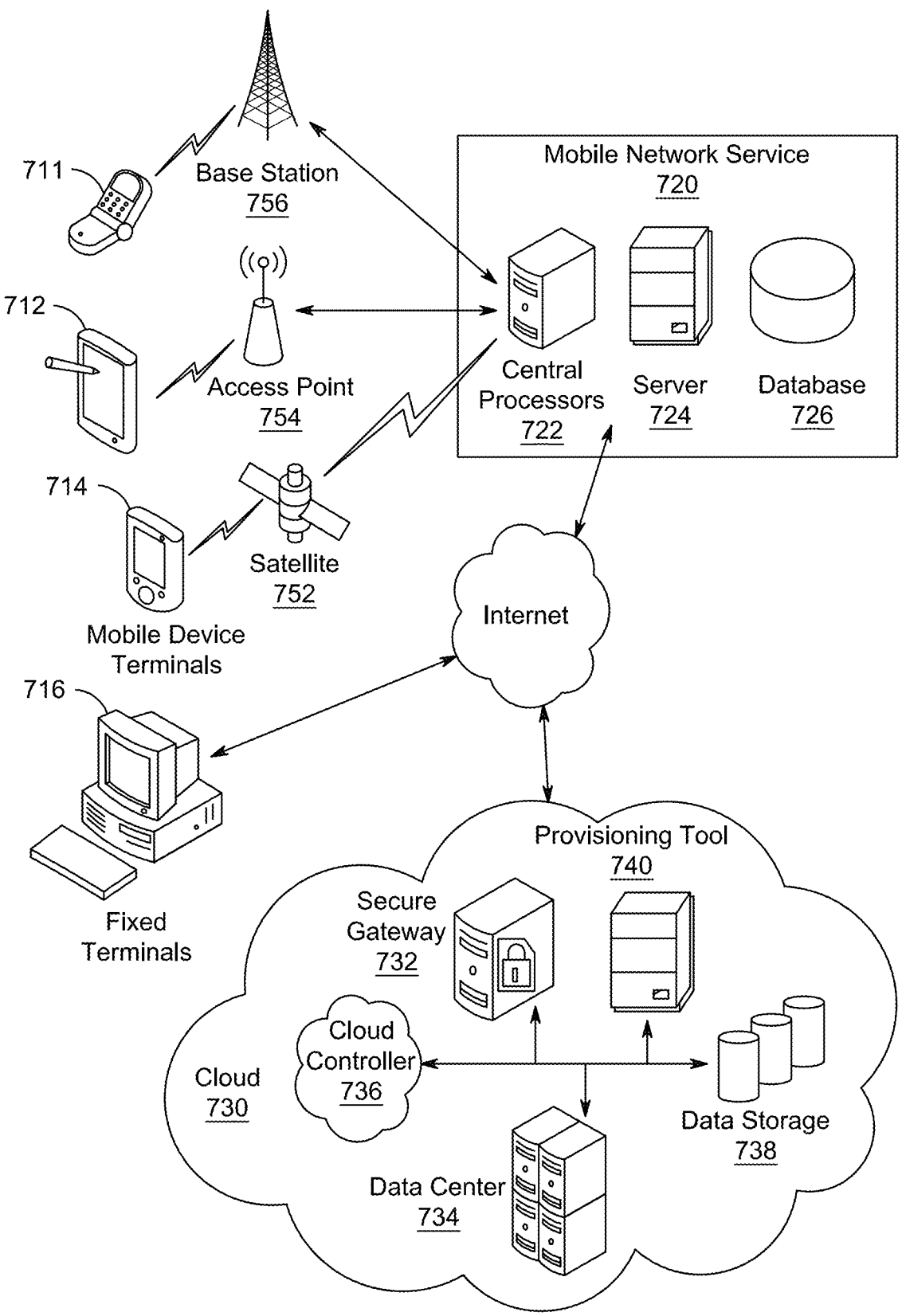
FIG. 7 is an illustration of a non-limiting example of distributed components that may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 7, in addition to various human interface and communication devices (e.g., display monitors, smart phones, tablets, personal digital assistants (PDAs)). More specifically, FIG. 7 illustrates client devices including smart phone 711, tablet 712, mobile device terminal 714 and fixed terminals 716. These client devices may be commutatively coupled with a mobile network service 720 via base station 756, access point 754, satellite 752 or via an internet connection. Mobile network service 720 may comprise central processors 722, server 724 and database 726. Fixed terminals 716 and mobile network service 720 may be commutatively coupled via an internet connection to functions in cloud 730 that may comprise security gateway 732, data center 734, cloud controller 736, data storage 738 and provisioning tool 740. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

Figure 8:
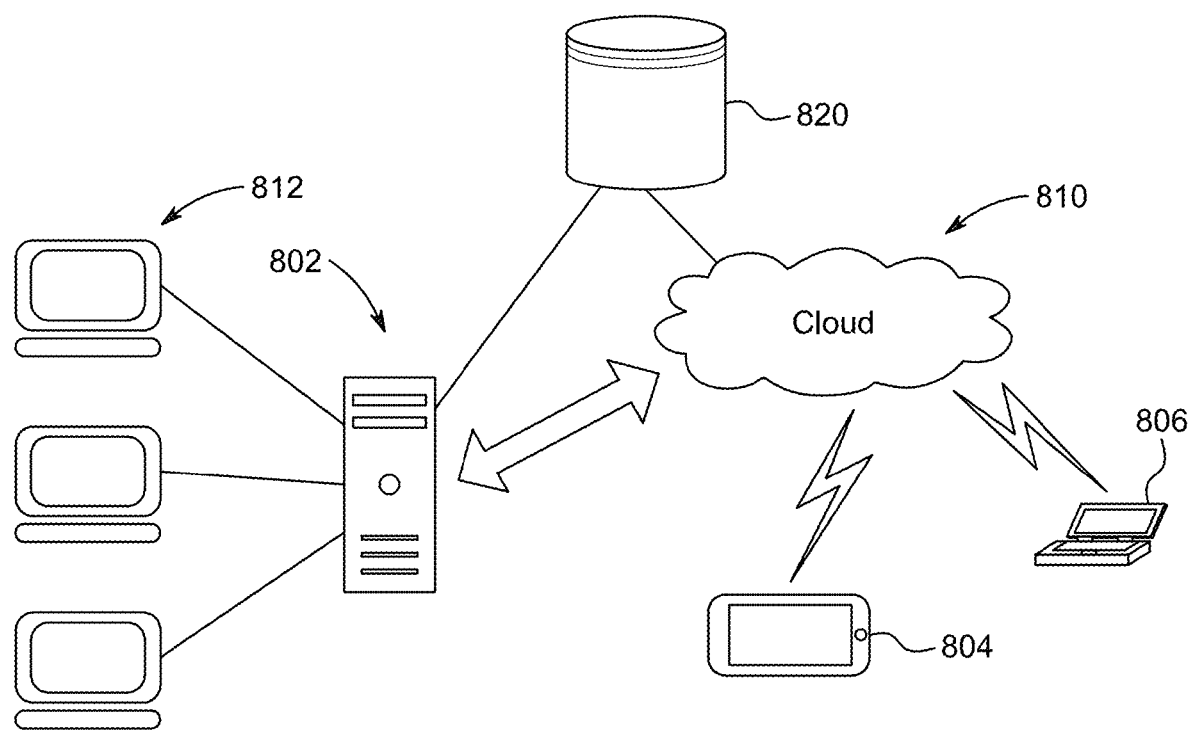
FIG. 8 is a diagram of an online conferencing system, according to aspects of the present disclosure.

FIG. 8 is a diagram of an online conferencing system, according to certain embodiments. In an exemplary embodiment, one or more desktop computers 812 and mobile devices 804, 806 may communicate via a network, such as a cloud service 810. Communications between devices can include voice/audio, video and data. Real-time image super-resolution of present embodiments can be performed at a receiving end of a conference, such as in a desktop computer 812 or mobile device 804, 806. In one embodiment, an intermediate server or AI workstation 802 may perform embodiments of the real-time image super-resolution. In one embodiment, the real-time image super-resolution is performed in a cloud service 810. The cloud service 810 is accessible via the Internet. The cloud service 810 may include a database system 820 for storing video and image data.

The online conferencing system further consists of elements that enable the capture and transfer of video images and audio sounds. The elements include a video input, such as video cameras, audio input, such as microphones, video output, such as a monitor or television, and an audio output, such as speakers and headphones. The elements further include hardware or software-based coder-decoder technology that compresses analog video and audio data into digital packets and decompresses the data on the receiving end.

In an aspect, the present disclosure is configured on a Lambda workstation. The Lambda workstation is a special purpose workstation for high performance computing, such as Machine Learning. In one embodiment, the Lambda workstation is configured with AMD Ryzen Threadripper 3960X 24-core processor, 64 GB RAM, NVIDIA GeForce RTX 3090 GPU, running Ubuntu operating system, and PyTorch.

FIG. 9 is a block diagram illustrating an example computer system configured to perform the training and inference methods for real-time image super-resolution of the present embodiments, according to an exemplary aspect of the disclosure. The computer system may be an AI workstation 802 running an operating system, for example Ubuntu Linux OS, Windows, a version of Unix OS, or Mac OS, or may be a desktop computer 812. Mobile devices 804, 806 may be configured in a similar manner, along with other built-in features that are not typically found in desktop computers, such as a cellular communication and accelerometer.

The computer system 900 may include one or more central processing units (CPU) 950 having multiple cores. The computer system 900 may include a graphics board 912 having multiple GPUs, each GPU having GPU memory, or an integrated GPU. The graphics board 912 or integrated GPU may perform many of the mathematical operations of the disclosed machine learning methods. The computer system 900 includes main memory 902, typically random access memory RAM, which contains the software being executed by the processing cores 950 and GPUs 912, as well as a non-volatile storage device 904 for storing data and the software programs. Several interfaces for interacting with the computer system 900 may be provided, including an I/O Bus Interface 910, Input/Peripherals 918 such as a keyboard, touch pad, mouse, Display Adapter 916 and one or more Displays 908, and a Network Controller 906 to enable wired or wireless communication through a network 99. The interfaces, memory and processors may communicate over the system bus 926. The computer system 900 includes a power supply 921, which may be a redundant power supply. In one embodiment, the Displays 908 are high definition display devices, having a resolution of 1080P or higher.

In some embodiments, the computer system 900 may include a CPU and a graphics card, in which the GPUs have multiple cores. A non-limiting example graphics card for the computer system 900 is an NVIDIA GPU, for example, with multiple CUDA cores. In some embodiments, the computer system 900 may include a System on a Chip configured with a machine learning engine 912. A non-limiting example of a System on a Chip with a machine learning engine 2212 is the M2, M3 series chips from Apple, as well as System on a Chip configurations available from NVIDIA, including nForce and Tegra series processors.

The above-described hardware description is a non-limiting embodiment of corresponding structure for performing the functionality described herein.

Numerous modifications and variations of the present disclosure are possible in light of the above teachings. It is therefore to be understood that the disclosure may be practiced otherwise than as specifically described herein.

The invention claimed is:

1. A video system for displaying super-resolution images generated from images of lower resolution, comprising:
    processor circuitry for a combination multi-core CPU and machine learning engine configured with
    an input for receiving the low resolution images;
    a feature extraction section to extract features from the low resolution images, the feature extraction section including a single standard convolutional layer that generates feature maps for the low resolution images;
    a non-linear feature mapping section, connected to the feature extraction section, using a self-calibrated block with pixel attention to map each feature map along with relevancy of features in the feature map to generate a three dimensional (3D) attention map, the self-calibrated block with pixel attention having a plurality of Depthwise Separable Convolution (DSC) layers;
    a late upsampling section, connected to the non-linear feature mapping section, using a first DSC layer, a pixel attention block, a second DSC layer, and a pixel shuffling operator that are connected in a cascaded manner to upsample the 3D attention maps to a predetermined dimension;
    a skip connection section for applying a bicubic interpolation function to upsample the low resolution images to the predetermined dimension;
    an element-wise addition section for generating super-resolution images that correspond to the low resolution images, by adding an output from the late upsampling section and an output from the skip connection section; and
    a video output for displaying the super-resolution images that correspond to the low resolution images, with a desired scale of at least two times the low resolution image.

2. The video system of claim 1, wherein the self-calibrated block with pixel attention of the processor circuitry includes a Parametric Rectified Linear Unit as an activation function, wherein the Parametric Rectified Linear Unit includes a parameter that is learned.

3. The video system of claim 1, wherein each of the plurality of Depthwise Separable Convolution layers of the processor circuitry includes a depthwise convolution section and a pointwise convolution section where the depthwise convolution section applies an element-wise product to a convolution kernel and to each channel of input features independently and the pointwise convolution section includes a kernel that iterates through every point.

4. The video system of claim 1, wherein the self-calibrated block with pixel attention of the non-linear feature mapping section of the processor circuitry includes an upper convolution section for high-level feature manipulation and a lower convolution section to conserve original image information, wherein the upper convolution section and the lower convolution section each have the DSC layers.

5. The video system of claim 4, wherein the upper convolution section includes a pixel attention block having a convolution layer to attain a 3D matrix of attention maps.

6. The video system of claim 1, wherein the plurality of Depthwise Separable Convolution (DSC) layers of the processor circuitry are 3×3 DSC layers.

7. The video system of claim 1, wherein pixel attention block has a convolution layer to attain a 3D matrix of attention maps.

8. The video system of claim 1, further comprising a decoder that decompresses video data to reconstruct the low resolution video images.

9. The video system of claim 1, wherein the video output is a high resolution display device of size sufficient to display the super-resolution images.

10. A method of displaying super-resolution images generated from images of lower resolution by processor circuitry for a combination multi-core CPU and machine learning engine, the processor circuitry comprising an input, a feature extraction section, a non-linear feature mapping section, a late upsampling section, a skip connection section, an element-wise addition section, and a video output, the method comprising:
    receiving, via the input, the low resolution images;
    extracting, via the feature extraction section, features from the low resolution images, the feature extraction section including a single standard convolutional layer that generates feature maps for the low resolution images;
    via the non-linear feature mapping section connected to the feature extraction section, using a self-calibrated block with pixel attention to map each feature map along with relevancy of features in the feature map to generate a three dimensional (3D) attention map, the self-calibrated block with pixel attention having a plurality of Depthwise Separable Convolution (DSC) layers;
    via the late upsampling section connected to the non-linear feature mapping section, using a first DSC layer, a pixel attention block, a second DSC layer, and a pixel shuffling operator that are connected in a cascaded manner to upsample the 3D attention maps to a predetermined dimension;
    via the skip connection section, applying a bicubic interpolation function to upsample the low resolution images to the predetermined dimension;
    via the element-wise addition section, generating super-resolution images that correspond to the low resolution images, by adding an output from the late upsampling section and an output from the skip connection section; and displaying, via the video output, the super-resolution images that corresponds to the low resolution images, with a desired scale of at least two times the low resolution image.

11. The method of claim 10, further comprising:
performing an activation function by a Parametric Rectifier Linear Unit that learns a parameter, wherein the self-calibrated block with pixel attention includes the Parametric Rectified Linear Unit as an activation function.

12. The method of claim 10, wherein each of the plurality of Depthwise Separable Convolution layers includes a depthwise convolution section and a pointwise convolution section, the method further comprising:
applying, via the depthwise convolution section, an element-wise product to a convolution kernel and to each channel of input features independently; and
iterating through every point, via a kernel of the pointwise convolution section.

13. The method of claim 10, wherein the self-calibrated block with pixel attention of the non-linear feature mapping section of the processor circuitry includes an upper convolution section and a lower convolution section, wherein the upper convolution section and the lower convolution section each have the DSC layers, the method further comprising:
manipulating high-level features, via the upper convolution section; and
conserving original image information, via the lower convolution section.

14. The method of claim 13, further comprising:
attaining a 3D matrix of attention maps, via the upper convolution section that includes a pixel attention block having a convolution layer.

15. The method of claim 10, wherein the plurality of Depthwise Separable Convolution (DSC) layers are 3×3 DSC layers.

16. The method of claim 10, further comprising:
attaining a 3D matrix of attention maps, via the pixel attention block having a convolution layer.

17. The method of claim 10, further comprising:
decompressing video data to reconstruct the low resolution video images.

18. The method of claim 10, wherein the predetermined dimension is the display size of a high definition video display device.

* * * * *